United States Patent [19]

Schwarcz

[11] 4,002,794

[45] Jan. 11, 1977

[54] ADHESIVE MATERIAL AND ARTICLES INCORPORATING SAME

[75] Inventor: Andor Schwarcz, Niskayuna, N.Y.

[73] Assignee: Nashua Corporation, Nashua, N.H.

[22] Filed: July 18, 1975

[21] Appl. No.: 597,080

[52] U.S. Cl. ........................... 428/352; 260/46.5 E; 260/824 EP; 428/40

[51] Int. Cl.² ........................................... B32B 9/00

[58] Field of Search ......... 260/46.5 E, 2 S, 824 EP, 260/77.5 AM, 47 EP; 428/352

[56] References Cited

UNITED STATES PATENTS 3,404,168    10/1968    Simmler et al. ........... 260/46.5 E X

*Primary Examiner*—Lewis T. Jacobs
*Attorney, Agent, or Firm*—Kenway & Jenney

[57] ABSTRACT

A copolymeric material is provided in accordance with this invention which is the reaction product of a di (omega-thio-organo) dimethyl siloxane oligomer having terminal active hydrogen groups and a difunctional organic compound having terminal isocyanate groups. The siloxane-thiourethane copolymer provides good release per se from tacky adhesive masses or when combined with other film formers.

15 Claims, No Drawings

ADHESIVE MATERIAL AND ARTICLES INCORPORATING SAME

BACKGROUND OF THE INVENTION

1. Field of the Invention

This invention relates in general to novel copolymeric materials suitable for use as a release agent or as a component in a release composition, and to methods for their preparation. It more particularly relates to coated substrates having a surface coated therewith such as release liners and pressure-sensitive adhesive tapes.

2. Description of the Prior Art

Pressure-sensitive adhesive tapes are generally manufactured and sold with the tape wound upon itself in convolutions to form a roll of some suitable length of tape. Consequently, when it is necessary to use the tape, it must be possible to unwind the desired length from the roll without excessive force or delamination of the backing, offsetting of the adhesive, or the like, regardless of the time or conditions under which the tape has remained in roll form prior to use. For these reasons, a coating known as a release coat or back size is generally provided on the back side of the tape backing member, i.e., the side opposite that on which the adhesive mass is applied. Such a coat, compared to an uncoated backing member, as is its objective, offers relatively low adhesion to the adhesive mass.

Although various release agents and compositions thereof have been developed over the years, none of them, to my knowledge, accomplish all the objects desired by their use. With some release agents, the release characteristics diminish with time, and particularly at high temperatures because of some chemical or physical change in the release material per se. Others interact with the adhesive mass, sometimes merely physical, so that adhesion to various substrates to which the tape is applied is adversely affected.

The extension of the pressure-sensitive concept beyond its early more limited usage has spurred the need for, in certain applications, more aggressive adhesives. As a result there have been rather simultaneous demands for improved release coatings to permit suitable removal of the adhesive from the backing member at the time of application.

Whether a material will be suitable or not as a release agent, in particular for pressure-sensitive adhesive tapes, depends upon a number of factors. The lower the interfacial tension between the adhesive mass and the material used as a release coating, naturally the better release provided; however, low interfacial tension alone is not enough. The material, to be useful as a release coat, should also be of a suitable cohesive strength and possess good adhesion with the backing member.

In the early 1950's, silicones were introduced as coatings for paper substrates to provide release surfaces for tacky materials. One use for these coated substrates was as backing members for pressure-sensitive adhesives. The silicones are a class of synthetic materials which are composed primarily of alternating silicon and oxygen atoms in the polymeric backbone. A variety of organic groups can be attached to the silicon atoms to make up the polymers that are referred to as organopolysiloxanes. The simplest polysiloxane, polydimethylsiloxane, is one in which methyl groups are attached to the silicon atoms. The physical nature of these polymers, e.g., whether resin, rubber, or oil, depends on the degree of polymerization as well as upon the nature of the end groups in the polymer. These groups can be relatively inert chemically, e.g., the trimethylsiloxy group, or they can be chemically active. An example of the reactive type is the silanol group.

It has been known for many years now, as earlier indicated, that certain silicones (organosiloxane polymers), or formulations thereof, can be applied to the surface of paper, various films and other substrates to render the surface thereof abhesive (i.e., non-adherent) to sticky and tacky material. Exemplary of this prior art are U.S. Pat. Nos. 2,882,183; 3,050,411; 3,328,482; 3,518,325; 3,565,838; 3,671,484; and 3,823,025. Of these, U.S. Pat. No. 3,518,325 discloses that, optionally, an isocyanate having at least two isocyanate groups per molecule, or a reaction product of such an isocyanate with a polyhydroxy compound, can be included in the silicone composition.

Organo siloxane compounds of the type disclosed in these patents are, in general, liquid materials having mainly dimethylsiloxy repeating units with a few functional groups chemically bonded to the main polymer chain. The liquid polymer is applied in solvent solution to which a catalyst such as dimethyl tin diacetate has been added. On evaporation of the solvent, a surface film of the liquid polymer is deposited which builds up in molecular weight, crosslinks, and a solid coating results. This process conventionally needs either high temperatures or long time at room temperature with the presence of moisture.

The necessity for curing the polymeric material after deposition has placed certain restrictions on the use of various siloxane polymers. This is because the temperature needed for curing, at least to the extent desired, has often exceeded the temperature which a substrate on which a release coating is desired could withstand. This has been particularly true where the substrate is a paper-thermoplastic film laminate, care being needed to avoid melting or otherwise ruining the thermoplastic film.

A further disadvantage associated with silicone release polymers with which I am familiar is their relatively poor adhesion to the various substrates on which they are coated. This poor adhesion is thought to be due to the scarcity of polar groups in the organo siloxane polymer. Consequently, the use of a primer is often needed to obtain better anchorage of the silicone film to the substrate. The fact that silicone polymers have good release characteristics in itself is sometimes a problem in that too good a release is provided. Thus, there may be too easy unwind in tape rolls and, in some cases, the adhesion between the adhesive mass and release coat may be so low that the roll doesn't remain tightly wound.

Heretofore others have disclosed the manufacture of polysiloxane-urethane copolymers. In U.S. Pat. No. 2,511,310, there is disclosed linear polymers from the reaction of bifunctional organo-silicone compounds, e.g., of formula $R_2Si(OH)_2$ wherein R is a monovalent hydrocarbon radical, with diisocyanates and diisothiocyanates, the reaction being preferably conducted at temperatures of 35° to 200° C. in an inert, anhydrous solvent. The polymers are, in general, solids of high softening points, e.g., 195° C and higher, and are soluble in, for example, phenol, and in some cases, formic acid and benzene. The polymers disclosed in this patent are said to be useful in the preparation of fibers, films, and plastics.

There has also been developed in recent years organofunctional silicone fluids, e.g. silicone polycarbinols, which combine typical silicone properties, for example, release, with alcohol reactivity. The silicone polycarbinols can be chemically bonded into any system which is reactive toward alcohol to permanently impart desirable silicone properties to that system. Thus, there can be provided silicone modified polyesters, silicone modified sulfonate, silicone modified urethanes, silicone modified melamines, and silicone modified phenolics.

Another organofunctional silicone fluid developed is one containing mercapto end groups. These mercaptosilicone compounds are disclosed in U.S. Pat. Nos. 3,388,144 and 3,388,145 assigned to Dow Corning Corporation. As disclosed in the latter patent (Example 1) a mecaptopolysilicone having a visosity of about 50–60 cs at 25° C can be used as a mold release agent for synthetic rubber. Compounds of the type disclosed in 3,388,145 can also be chemically bonded to rubber to give anti-blocking characteristics to uncured rubber stock thus obviating the need for, e.g., talc.

In U.S. Pat. No. 3,725,000 (Dow) there is disclosed a polysilicone lubricating finish for Spandex fibers in which a radical is provided on the polysiloxane containing an isocyanate reactive group, e.g. isocyanate, amino, hydroxyl, and mercapto groups, reactive with the Spandex fibers. Thus, when the polysiloxane finish is applied to the fibers, apparently a chemical bond results between the two which is believed responsible for the non-migrating characteristics of the lubricating finish.

Other prior art of which applicant is aware are U.S. Pat. Nos. 3,170,891 and 3,509,193. The former patent is directed to an organosilicone isocyanate. As disclosed therein, the isocyanate radical of such a compound will react with any active hydrogen, such as a hydrogen attached to oxygen, nitrogen, and sulfur. The invention in the latter patent is directed to the manufacture of a mercaptomethyl substituted organopolysiloxane useful as a water-repellant impregnating agent.

Moreover, it has been suggested heretofore to use a silicone release agent in combination with a film forming resin, e.g. melamine or urea formaldehyde resin. Such a mixture is disclosed in U.S. Pat. No. 3,061,567. Thus, it has been found with such a composition that the organic resin is apparently preferentially absorbed on the substrate surface on which the release composition is deposited. This allows the silicone to be concentrated on the surface, thereby making for better release. For a given release less silicone is needed. The ratio of organosiloxane to organic resin in the mixture, as disclosed by the patentee, is not critical and can vary over a wide range.

SUMMARY OF THE INVENTION

The above-mentioned disadvantages with organosiloxane release compounds can be largely eliminated by the modified silicone polymers disclosed herein.

It is accordingly an object of the present invention to provide polyorganosiloxane compounds suitable for use as release agents which offer improved properties over those heretofore available.

It is a further object of the invention to provide improved back size compositions comprising the release agent herein disclosed and a film former.

It is a further object of the invention to provide a pressure-sensitive adhesive tape in which the backing member thereof is coated on its backside with the improved release agent of this invention.

The release agents of this invention are copolymeric materials which result, in the basic aspect, from the reaction between a thio-or mercapto-terminated polyorganosiloxane and a difunctional organic compound having terminal isocyanate groups. This latter compound, instead of being a diisocyanate, can be a polyurethane prepolymer resulting from the reaction between a difunctional organic compound containing active hydrogen groups with a large excess of a diisocyanate.

Thus, the compounds of this invention are prepared, in general, by the copolymerization reaction of at least two, and optionally a third, components. The first component, which will sometimes be referred to as component A, is a dimethyl siloxane oligomer having alkylene thio groups at each end of the molecule. The second component (component B) is a difunctional organic compound terminated at each end with isocyanate groups, the isocyanate groups being reactive with the active hydrogen of the thio or mercapto group. Optionally, and depending on whether the second component is an isocyanate terminated prepolymer or not, the third component (component C) is a difunctional organic compound having two terminal active hydrogen containing groups.

The reactant products of this invention, and this is of particular advantage, can be coated onto various substrates without need for any further chemical buildup for their functioning as a film forming release coating. The release coats need not be subjected to curing heretofore deemed necessary with silicone release coats. Thus, high curing temperatures or long processing (curing) times can be avoided thereby lending greater advantage in, e.g., pressure-sensitive adhesive tape manufacture. One particular advantage resulting from this feature is the fact that the release agent of this invention can be used with various heat-sensitive substrates. As the release agent can be used in release compositions comprising other film formers, the number of different film formers that can be used is also enhanced by this feature.

The release agents of this invention offer good adhesion with various substrates particularly those used conventionally as backing members in pressure-sensitive adhesive tape manufacture. Moreover, consistent release is provided even with those adhesives which are considered aggressively tacky.

The copolymers of this invention are advantageously characterized by a combination of properties not found in either moiety alone. The silicone portion, though in relatively minor proportions in the copolymer, contributes highly desirable release characteristics. It, moreover, is believed totally unexpected that these copolymers would exhibit surface tension characteristics substantially if the polyorganosiloxane had not been copolymerized with a urethane segment.

The urethane segments contribute polar groups to the copolymer which, in turn, provide good adhesion, without need for a primer, between the release agent and various substrate materials. The copolymer portions are linked together with these divalent polar groups, e.g., carbamate, urea, and thiocarbamate. These groups and aromatic groups introduced by the diisocyanate component, and the optional active hydrogen containing component render the polymer solid when they are present in sufficient amount.

The nature and amount of components B and C, compared to the amount of component A, determine the degree of hydrophobicity, and release from, e.g., pressure-sensitive adhesive masses. In general, the greater the surface tension of components B and C and the A/(B + C) ratio, the better the release characteristics. It also appears that the copolymer has to be of sufficient molecular weight to be a solid (not liquid) under normal use conditions to function as a release agent.

Not to be overlooked in the advantages offered by the copolymers of this invention is the fact that advantageous release properties can be obtained at a cost much less than that of a release agent which is solely a silicone homopolymer. Moreover, satisfactory release in some applications can be obtained even more cheaply by blending the release agent of the invention with a further, and less costly, film former. When the film former is of greater surface tension than the siloxane-urethane copolymers of the invention, the copolymer material will bloom to the surface and the coating or backsize composition will exhibit release characteristics determined by the release agent component.

In satisfaction of the foregoing objects and advantages, there is provided a novel class of copolymeric release agents for, inter alia, pressure-sensitive adhesive tapes, the silicone-urethane copolymers of which may be described by the following general recurring repeating unit:

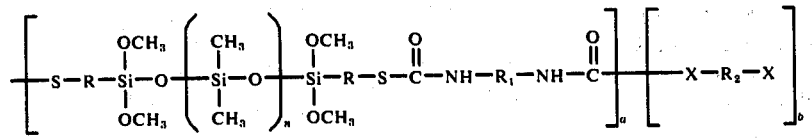

wherein S is sulfur, R is an olefin hydrocarbon radical having at least two up to 8, preferably no more than six, carbon atoms, $R_1$ is a divalent hydrocarbon radical selected from the group consisting of aliphatic and aromatic radicals, X is a member selected from the group consisting of O, S, and —NH, $R_2$ is a member selected from the group consisting of divalent radicals selected from the group consisting of alkyl, and alkyl-aryl, polyethers, and polyesters, n is an integer from 5 to 100, and a and b are integers chosen so as to provide a copolymer having a molecular weight as defined by an intrinsic viscosity of at least 0.05, the ratio of b/a is between 0 and 3, and the polysiloxane block is present in an amount from 30 to 95% of the copolymer.

These release agents can be used alone, for example as a coating on a substrate, or as a component with another film former in a release or backsize composition. In the latter instance, the backsize composition is provided as a coating on a substrate from which release is desired. These substrates may be, for example, of various configuration such as molds for molding three dimensional objects or of planar configuration such as used in the manufacture of release liners.

There is further provided by this invention novel pressure-sensitive adhesive tapes containing these copolymeric materials or compositions thereof on the backing member as a release coat.

DETAILED DESCRIPTION OF THE INVENTION AND THE PREFERRED EMBODIMENTS

This invention relates to linear copolymers formed by an addition type reaction between from 20 to 95% by weight of dimethyl organo siloxane oligomer of the structure

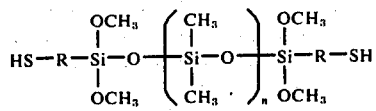

wherein R is an olefin hydrocarbon radical having at least two carbon atoms, and n is an integer from 5 to 100; from 5 to 75% by weight of a difunctional organic compound capable of reacting with the active hydrogens of the thio or mercapto terminal groups of the dimethyl siloxane oligomer selected from the group consisting of aliphatic and aromatic diisocyanates and diisocyanate prepolymers resulting from the reaction of a difunctional compound containing active hydrogen groups with a large excess of diisocyanates; and, optionally, from 0 to 70% by weight of a second difunctional organic compound having terminal active hydrogen groups and capable of reacting with the isocyanate groups in the first difunctional organic compound when this compound is selected from the group consisting of aromatic and aliphatic diisocyanates.

The reaction to the copolymer occurs between the reactive terminal groups of the polysiloxane and the isocyanate groups of the difunctional organic compound. The copolymers though containing a relatively large number of polar groups are characterized by their low critical surface tension as later disclosed which makes then ideally suited as release agents or as components in release coat compositions.

The process for the manufacture of the siloxane urethane copolymers according to this invention, in general, involves reacting sufficient quantities of the reactants A, B, and optionally C, so as to satisfy the stochiometric balance of the active hydrogen containing groups in reactants A and C, and the isocyanate groups in reactant B. A slight excess (3-10%) of one of the reactants, preferably component B, can be used to prevent excessive molecular weight buildup, i.e., gelation of the solution. The reaction, in general, is carried out in the presence of solvents that do not contain active hydrogen. Those which are suitable include aliphatic and aromatic hydrocarbons, hydrocarbon ethers, esters, halogen hydrocarbon ethers and esters, polyethers, di-N-substituted amides, dialkyl sulfoxide, organic nitrile, and mixtures thereof. If a solvent is not used, the reaction product may be difficult to dissolve as a result of various side reactions which occur with isocyanate groups which is more difficult to control without solvent.

In the practice of the invention, a mixture of the reactants can be prepared by mixing and stirring the various reactants together in an organic liquid such as above-named, or mixture thereof, which is a solvent for the reaction product. The procedure of dissolving the reactant components in separate solvents and thereafter mixing the solutions together may also be employed.

Any of the conventional solvents can be employed in the practice of the invention provided the solvent is inert to the reactant mixture. The solvent should, of course, be a solvent for the reaction product and must be a solvent for at least one of the reactants. Preferably, the solvent is a solvent for all the reactants. The solvent should be one that can be readily removed by volatilization and by application of reasonable amounts of heat. Those solvents which will be found satisfactory include 2-butanone, dimethylsulfoxide (DMSO), ethylacetate, butylacetate, the N,N-dialkyl (amides) such as N,N-dimethyl acetamide and N,N-dimethyl formamide (DMF), ethylene glycol acetate monoethyl ether, acetone, toluene, and mixtures of these solvents, e.g., 2-butanone-DMSO, 2-butanone-DMF, and toluene-DMF. Other solvents and solvent mixtures can obviously be used. Ethyl alcohol can be used both as a solvent and chain stopper; however, it can be used as a solvent only after the reaction with NCO has subsided.

The quantity of organic solvent used in the present invention need be only that sufficient to dissolve enough of the reactants to form a medium for initiation of the reaction between the di (omega-organofunctional) dimethylsiloxane oligomer, and the difunctional organic compounds reactant therewith. Generally, the solvent comprises from 50 to 99.8% of the total weight of all the reactants, preferably from 50–80%. This results in a reactant product which is from about 20–60% by weight of the combined weight of solvent plus reactant product and provides a composition suitable for coating.

In determining a specific time-temperature relationship for forming the polysiloxane-urethane compounds of this invention, several factors must, of course, be taken into consideration. In general, however, refluxing is continued for such a time as is necessary to react all the available reactive groups. The maximum permissable temperature will depend upon the particular reactants, solvent, solids desired in the final solution, and the minimum period of time one desires for reaction. Generally, temperatures below 100° C. are adequate for the purpose if one uses a suitable catalyst, as hereinafter described.

As the reaction tends to be exothermic, it may be only necessary to mix the various components together and permit the temperature to rise to the exotherm temperature and further adjusting the temperature with or without the intentional addition of heat. The reaction is conducted under anhydrous conditions for such a time at the selected temperature that is practical to provide the desired results.

The quantity of organic diisocyanates to be used in the invention is dependent upon the quantity of active hydrogen groups in reactant components A and C, the particular diisocyanate compound used, the molecular weight of the diisocyanate, the desired degree of polymerization, etc. All of these factors, while influencing the amount of diisocyanate to be used are easily taken into account by one skilled in the art to determine the precise amount of (—NCO) groups required in any particular formulation.

If desired, catalysts that are normally used to accelerate the —NCO reaction can be employed in the instant invention. The use of a catalyst is particularly useful to accelerate the —NCO plus —SH reaction. These include tertiary amines such as triethylamine, tributylamine, pyridine, N-methylmorpholine, polyamines such as triethylene diamine, and organometallic compounds such as stannous oleate, dibutyl tin dilaurate, zinc octoate and cobalt naphthenate. Combinations of two or more of the above catalysts can be used, as is well known. The use of a catalyst or combination thereof in the practice of this invention, however, is immaterial to the basic aspects of the invention. Nevertheless, as disclosed hereinafter, the crosslinking of the dried film is aided by inclusion of a catalyst.

After forming the siloxane-urethane compound, any unreacted materials can be removed, if desired, and the solution can be diluted with further solvent to provide a solution of the desired solids concentration, for example 0.25 to 5% by weight solids, for coating. On the other hand, the siloxane-urethane copolymer can be precipitated by the addition of water or other suitable non-solvent, washed, dried and later redissolved in a suitable solvent, when application as a coating is desired. After solution casting of the film from the polymerization mixture or any desired solvent, the solvent is evaporated thereby depositing the copolymeric material on the substrate on which the solution was cast. Cross-linking of the dried film occurs by the oxymethyl groups reacting with atmospheric moisture thereby further hardening the film.

The desired polysiloxane-urethane compounds of this invention are characterized by their molecular weights by means of intrinsic viscosity when measured at 30° C., at a concentration of 0.5 percent, by weight, of the polymer in a solvent such as tetrahydrofuran. The intrinsic viscosity of the polysiloxane compound should be at least 0.05, and preferably in the neighborhood of from about 0.06 to 0.2. The preferred copolymers in accordance with the invention are those having about 30–95% of component A.

The dimethylorganosiloxane oligomer used in the practice of the invention, and its method of manufacture, is not in and of itself a part of my invention. One such a silicone copolymer, and the one preferably used in the practice of this invention, referring back to the formula earlier disclosed, where R=3, is available commercially from Dow Corning Corporation of Midland, Michigan. Thus, it is seen that this silicone copolymer has at each end thereof an active hydrogen containing group, in this case the thiol or mercapto (—SH) group.

As is well known in the art, polyurethanes are formed by reaction of an isocyanate group with an active hydrogen. Thus, when component B reacts with the mercapto alkyl terminated polysiloxane, a urethane linkage is formed. Any of the isocyanates heretofore used for the formation of polyurethanes are suitable for the purposes of the present invention provided they are diisocyanates. Polyisocyanates are to be avoided as they mainly result in undesirable cross-linking reactions. Those diisocyanates which can be used in the practice of the invention, in general, include aliphatic diisocyanates, aromatic diisocyanates, cycloaliphatic diisocyanates, etc., the primary consideration being that component B be at least and only difunctional. In addition, mixtures of two or more species, kinds and types of the isocyanate functional component can be employed.

Examples of diisocyanates that can be employed in the instant invention include toluene-2,4-diisocyanate, toluene-2,6-diisocyanate, metaphenylene-diisocyanate, methylene-bis-phenylisocyanate, bitoluene diisocyanate 3,3' dimethoxy 4,4' diphenylene diisocyanate, and hexamethylene diisocyanate. Other than the previously named diisocyanates compounds, diisocyanate terminated prepolymers can be used.

When the diisocyanate difunctional organic compound is an aliphatic or aromatic diisocyanate, it will be necessary to include as a further reactant component a difunctional organic component having terminal active hydrogen groups. These will be described more fully hereinafter. On the other hand, the diisocyanate component can be an isocyanate terminated polyurethane prepolymer.

The manner of preparation of polyurethane prepolymers is well known to those skilled in the art of polyurethane chemistry and is believed to require no detailed explanation herein. In general, however, the manner of preparation requires reacting a relatively large excess of a diisocyanate with an organic compound having terminal active hydrogen groups (component C). Compounds of this type include, for example, simple diols such as ethylene glycol, hexamethylene diol, and triethylene glycol, and aliphatic and aromatic diamines such as ethylene diamine, hexamethylene diamine, propylene diamine, and methylene-bis(4-aniline), dithiols such as hexamethylene dithiol, ethylene thioglycol, and propylene thioglycol, and diacids such as succinic acid. Water can also be used. Other diols, which can be used in the practice of the invention include hydroxy terminated linear polyesters and polyethers, the preparation of either of which is well known. The polyesters, in general, are prepared by the thermal esterification of any glycol such as ethylene glycol, diethylene glycol, etc., with dicarboxylic acids such as adipic acid and the like.

Suitable hydroxy terminated polyethers can be prepared, for example, by the polymerization of ethylene oxide or by the condensation of ethylene oxide with a dihydric alcohol as is well known in the art. Examples of dihydric alcohols include ethylene glycol hexamethylene diol, and the like.

Thus, hydroxy-terminated polytetramethylene glycol of 1,000 molecular weight, hydroxy-terminated polyethylene glycol of 2,000 molecular weight, hydroxy-terminated poly(ethylene adipate) 300–3,000 molecular weight, amine terminated polyoxyethylene of 1,500 molecular weight, and thiol-terminated polyoxyethylene of 200–2,000 molecular weight will be found suitable in the practice of the invention. The presence of any of these compounds in the polymer chain, as will be obvious, modifies the physical properties of the resulting copolymers. Higher molecular weight compounds, in general, tend to make a softer copolymer while those of lower molecular weight tend to result in a harder copolymer.

The preferred component C are the polyether and polyester diols as they react at a more desirable rate with isocyanate. Reactions with diamines are very fast and usually difficult to control while those with diacids and thiols are usually less fast than desired for their use to be practical.

The role of Component C is to function as a chain extender. As such it decreases the cost of the copolymer release agent without adversely affecting its release properties for pressure-sensitive adhesive tape applications. The molecular weight of the Component C material can vary from 60–3000; however, a range from about 60–1500 is preferred. While component C is usually a single material, mixtures will sometimes offer advantageous results. Not only mixtures of different materials can be used but mixtures of the same materials but of different molecular weights, e.g., one of high molecular weight and another of a relatively lower molecular weight can be used.

Copolymers in accordance with the invention can be used in a wide variety of applications. One of the preferred uses is as a release coat in the manufacture of pressure-sensitive adhesive tapes. However, the copolymers can also be used as release coatings on papers and other substrates, and as parting agents in molds, etc. The copolymers will also find use as water repellant surfaces on papers, textiles, metals, plastics, etc.

The copolymeric release agents of this invention can be used alone or then can be mixed with various other film forming materials to form a release or backsize composition. Such a composition is of particular advantage, as satisfactory release properties in some instances can be provided much more economically, for example, when the substrate coated is relatively porous as is the case of a paper backing member in the manufacture of pressure-sensitive adhesive tape. The release agent is present in the release composition in only a minor percentage by weight, e.g., in the order of from 0.1 to 10%. Thus, as the siloxane release agent is the more expensive component of the release compositions, its use therein results in considerable savings. As the silicone copolymers of the invention need not be cured to be a satisfactory release material, the release copolymers can be intermixed with various film formers including those which heretofore could not withstand the silicone curing temperatures, and therefore could not be used. Thus, the silicone release copolymers of this invention can be intermixed with epoxy resins, polyesters, polyamides, acrylics, urethane, polyvinylchloride and other film forming resins. The release agent can be dispersed, if desired, in emulsions or latices of the resins.

In general, it will be found that when mixing the reaction products of this invention with another film former, the greater the difference between the film former surface tension and that of the siloxane-urethane copolymer, the better will be the release characteristics of the release composition. This is because the siloxane copolymer, the lower surface tension component in the composition, migrates to the outer surface of a coating of the composition. Thus, the greater the difference in surface tension between the two components of the release composition, the better release properties provided. There should be, for optimum results, a difference of at least 15 dynes/cm.

The polysiloxane-urethane release agent or composition can be applied to various substrates depending on the application intended, and by various means. Where the substrate is fibrous, e.g., papers and textile fabrics, the polymeric material can be applied by such operations as immersion, spraying, brushing, and roll coating. The more complete the coverage naturally the better the results obtained.

After a layer of the solution is established on the desired substrate, heat and moving air is, in general, applied to volatilize the solvent thereby leaving a deposit or coating of the release agent or composition on the substrate. The heat necessary to accomplish the desired evaporation depends on the air velocity and the particular solvent used. This can easily be determined by those skilled in the art for any particular situation. The prime consideration is that solvent evaporation be complete. Air drying can, of course, be used for solvent removal but this takes rather extended time periods and is not practical in most situations.

As earlier mentioned, the copolymeric materials of this invention have been found to be extremely useful as release agents for pressure-sensitive adhesive tapes. Thus, a further aspect of the invention comprises a pressure-sensitive adhesive material which includes a pressure-sensitive adhesive on one side of the backing member and the novel release coating agents or compositions thereof as hereinbefore described, on the other side. There may optionally be included a primer coating on the front side or surface of the backing material in order to improve its surface bonding characteristics to the pressure-sensitive adhesive which is applied thereon. Quite advantageously, however, there need be no primer or tie-coat on the back surface of the backing member in order to provide the desired bonding characteristics of that surface to the release coating composition applied thereon. The invention is also inclusive of rolls of pressure-sensitive adhesive tape of suitable width and length converted from the adhesive material.

The pressure-sensitive adhesive composition can comprise any elastomeric material such as natural or synthetic rubber, examples of which include polyisobutylene, polybutadiene, polychloroisoprene, polyisoprene, and ethylene-propylene polymers, polyvinyl $C_1$–$C_4$ ethers, copolymers of butadiene and acrylonitrile, butadiene and styrene, styrene-isoprene, polyacrylates, and other synthetic and natural rubbers or elastomers. The elastomers described may be used separately or in combination. The adhesive composition may and usually does also include resinous components known as tackifying agents. Examples of tackifying agents include polyterpene resins, hydrocarbon resins, polymerized or disproportionated rosin esters, wood rosin, oil soluble phenolic resins and the like.

Other components which may be, and are conventionally, included in the pressure-sensitive adhesive compositions include fillers such as clays, diatomaceous earth, silica, talc, titanium dioxide, calcium carbonate, etc.; anti-oxidants, as for example, zinc oxide, butyl zimate, polyhydric phenols and their alkyl derivates, diaryl amines, metal chelating agents, etc.; and plasticizers such as mineral oil, lanolin, liquid polybutenes or polyacrylates.

Optionally, as before-mentioned, primers which improve the bonding characteristics between certain backing material surfaces and a pressure-sensitive adhesive composition applied thereto may be used. These include natural and synthetic elastomer and combinations thereof which can be applied in solution or in latex form. Many are known in the art and depend, of course, on the particular adhesive composition and backing member used.

The pressure-sensitive adhesive composition is preferably applied to the backing member, which may or may not have a primer coating thereon, in the form of a solvent solution or emulsion. However, it may also be applied as a hot-melt adhesive. The solvent may be any solvent for the particular pressure-sensitive adhesive, including aromatics such as benzene, toluene and xylene, alphatics such as low boiling naphthas, hexane, pentane and the like, ketones such as methyl-ethyl-ketone and methyl-isobutyl-ketone and chlorinated hydrocarbons such as chlorobenzene, trichloroethylene, ethylene dichloride, and carbontetrachloride. Alcohols and water or other polar solvents may be used when applicable as a solvent or emulsifying medium for the adhesive.

The pressure-sensitive adhesive composition is generally prepared by first dissolving the elastomeric component in a suitable solvent, or dispersing it in an emulsifying solution. To the suitable solution may then be added the various additives, as for example, the tackifying agent, plasticizer, antioxidant and filler. The components are blended in the solvent or emulsified until smooth. Heat may be required to achieve a uniform solution or dispersion.

The adhesive composition is applied to the backing material (which may first have been coated with a primer coating), by any convenient method, as by calendaring, extrusion, kiss roll coating, etc. The solvent or emulsifying liquid, where the composition contains these, is removed from the adhesive composition by evaporation by heating. This is accomplished, as in the case of application of the release composition, by air drying, by passage through a circulating hot air oven, by passage over steam heated cans, or other conventional means. The coating and drying means used, or available, will, of course, largely determine the percent solids of the coating composition and solvent. The adhesive material is then generally wound on itself for storage and for slitting into rolls of suitable width and length.

The weight of the pressure-sensitive adhesive composition (on a dry basis) is preferred to be in the range of between about 0.5–4.0 ounces per square yard of backing member, but may be outside this range if required for specific purposes.

Application of the release agent to the back size of the backing member may be, as before-mentioned, by dissolving the polymeric material in a solvent or dispersing it in a carrier and applying this composition to the backing material by means of roll coating or the like. The composition may also, where desired, include another film former. For convenience of handling, a 0.25 to 10% weight solution of release agent or composition is preferred. The solvent or carrier is removed by evaporation thus leaving a thin film residue of release agent composition on the backing member. The desired coating weight depends on whether release agent or release composition, i.e., including a film former, is applied and the type of substrate. The amount deposited wet should generally be on the order of from 0.05 to 0.5 oz/yds$^2$. In the case of a porous substrate, a greater weight should be deposited than with a non-porous substrate so as to have a satisfactory amount of dried film on the substrate.

As to the backing member, any material ordinarily used for this purpose may be used with the particular material chosen dependent on the end use for the pressure-sensitive adhesive tape. Examples of suitable backing materials include fibrous and non-fibrous materials which may be made by weaving, compounding, extruding, etc., as for example, backing materials such as paper, cotton and other cellulosic materials, plastics such as acetates, vinyl halides, polyalkylene and polyester films, glass fabrics, metal foils, etc. The papers can, if desired, be saturated, or impregnated with various materials such as latex, natural or synthetic. The backings can also be combination backing members, e.g., an impregnated paper laminated to a plastic film or metal foil.

The invention will be further illustrated and described by reference to the following specific examples. The proportions here and elsewhere are expressed as parts by weight unless specifically stated to the contrary.

EXAMPLE 1

The components indicated below, except the triethylene glycol and the second portion of the TDI (36.5g), were charged into a 2 liter flask equipped with a stirrer, condenser, and thermometer and were stirred for ½ hour at 50° C. Triethylene glycol (37.5 grams, 250 m moles) and the second portion of the TDI were then added and stirring under reflux was continued for 1½ hours.

| COMPONENTS | WEIGHT (Grams) |
|---|---|
| mercapto silicone ($M_n$=3000, 50mMoles) | 150.0 |
| 2,4-Tolylene diisocyanate (100 + 210mMoles) | 17.4 + 36.5 |
| Triethylene Glycol, 250mMoles | 37.5 |
| Triethylene diamine | 1 |
| Dimethyltin diacetate | 1 |
| 2-Butanone | 800 |
| N,N-Dimethyl formamide | 80 |
|  | 1123.4 |

Infrared analysis indicated complete reaction after about 2 hours. This was indicated by quasi disappearance of the -NCO band and the appearance of the carbamate peak. Fifty (50)g. ethanol was added to the reaction mixture to preclude any further polymerization as well as to provide a more homogeneous solution.

The mercapto siloxane component is a fluid and is available commercially from Dow Corning Corporation of Midland, Michigan. It is described by them as having the following physical properties:

| % active ingredients | 100.0 |
|---|---|
| % SH | 2.2 |
| % OCH$_3$ | 4.2 |
| flash point | 240° F. |
| viscosity | 60 cs. |
| specific gravity | 0.988 |
| pour point | −100° C. |
| color | slight amber |

A small amount of the reactant product solution was withdrawn and the solvent was allowed to evaporate therefrom at room temperature. A transluscent rubbery residue remained. Its infrared spectra showed typical bands of a siloxane-thiourethane copolymer. The siloxane moiety of the copolymer constitutes 62% of the total weight of the copolymer.

Intrinsic viscosity, measured according to usual techniques, in a mixture (9/1 by volume) of tetrahydrofuran/ethanol was determined to be 0.12.

The critical surface tension was determined to be 19 dynes/cm. This value was obtained as follows: A smooth film of the release agent dissolved in a 2-butanone/ethanol (80/20) mixture (at the 2% concentration) was formed using a 1 inch bar wound with a 0.005 in. wire. Following solvent evaporation, the contact angle of the two drop forming liquids, n-hexadecane and polyglycol 15-200, was measured and surface tension calculated as described in the article of applicant appearing in *The Journal of Polymer Science, Polymer Physics Edition*, Vol. 10, 2025-2031 (1972).

Quite unexpectedly the surface tension value of 19 dynes/cm for the release agent of the invention is the same as that determined for the polydimethyl siloxane homopolymer.

By comparison, the surface tension of other polymer material has been determined to be as indicated below:

| POLYMER MATERIAL | CRITICAL SURFACE TENSION (dynes/cm) |
|---|---|
| polyethylene | 30 |
| polyvinyl chloride | 34 |
| polyethylene tetraphthalate | 41 |
| nylon-66 | 43 |
| polyethylene glycol | 42 |

EXAMPLE 2

A 1 mil Mylar A polyethyleneterephthalate film (available from DuPont) was coated with a laminating cement having the following composition:

| Component | Parts By Weight |
|---|---|
| Nitrile Rubber | 16.0 |
| Chloroprene | 6.4 |
| Zinc Resinate | 9.6 |
| Toluene | 61.2 |
| Acetone | 6.8 |

Solvent evaporation in a forced air oven (200° F. for 10 minutes) resulted in a dried adhesive film 1.5 oz/yd$^2$. A woven glass cloth having 32 warp yarns per inch and 8 fill yarns per inch was then superimposed on the dried adhesive layer and was thereby laminated to the polyester film. This was accomplished by passing the superimposed layers together through the nip formed by a pair of steel rolls.

The film side of the film-cloth lamination was then backsized with a 2% solution of the release agent of Example 1 made by diluting the solution therein with a mixture of 2-butanone-ethanol (80–20 by wt.). The backsize composition was applied with a 1 inch bar tightly wound with a 5 mil wire. Solvent was driven off with forced air at room temperature (74° F.) leaving a release layer of 0.003 oz./sq. yd. (dry) on the polyester film.

To the other side of the laminate was then applied a hot melt pressure-sensitive adhesive composition which had been prepared by mixing together the following components:

| COMPONENT | PARTS BY WEIGHT |
| --- | --- |
| Kraton 1107* | 100 |
| Polyterpene Resin, m.p. 95° C. | 50 |
| Glycerol Ester of Hydrogenated Rosin, m.p. 73° | 50 |
| Polyterpene Resin, m.p. 25° C. | 50 |
| Butyl Zimate (Zinc dibutyl dithiocarbamate) | 5 |
| Antioxidant | 2 |

*A styrene-isoprene-styrene block copolymer manufactured by the Shell Chemical Co.
The adhesive composition (heated to 350° F.) was extrusion coated onto the woven glass cloth (2.4 oz./sq. yd.).

The adhesive composition (heated to 350° F.) was extrusion coated onto the woven glass cloth (2.4oz./sq. yd.).

The adhesive material thus produced was wound upon itself (60 yards) and slit into narrow width rolls (1 inch wide) of pressure-sensitive adhesive tapes.

Two other, and similar, adhesive tapes were prepared, differing from that already described only in that the backsize composition used was that of typical commercially available release agent. On one tape was coated an organo-polymer type release agent. The release agent used on the other tape backing member is a commercially available poly(dimethyl) siloxane available from General Electric Company under the trade designation S41C4. This is a heat curable release agent (using dimethyltin diacetate as a catalyst), and was cured at 210° F. for 10 minutes.

These adhesive tapes were then subjected to various tests, as below indicated, to determine the comparative performance characteristics of a pressure-sensitive adhesive tape using a release coat in accordance with the invention. Prior to testing, the adhesive tapes were each submitted to accelerated aging conditions as follows:

Dry Heat Aging: In a forced air oven at 150° F. for 16 hours.

| Wet Aging: | Oven -- 150° F., 85% R.H., 20" Hg pressure of O₂, for 16 hours. |
| --- | --- |
| Cycle Aging: | Dry heat aging + 24 hrs. at 72° F. and 50% R.H. + wet aging for 2.5 hours. |

All testing was then done at 72° F., 50% R.H. The following results were obtained:

|  | Unwind$^a$ Adhesion lbs./in. | Adhesion to$^b$ Stainless Steel oz./in. | Quickstick to$^c$ Stainless Steel oz./in. |
| --- | --- | --- | --- |
| Aging Conditions | Cycle | Dry Heat | Dry Heat |
| Tape with the non-curing polysiloxane-urethane release agent according to the invention | 1.5 | 122 | 22 |
| Tape with the organo polymer release agent | 10$^d$ | 109 | 18 |
| Tape with the heat curing siloxane release agent | 1.7 | 105 | 17 |

$^a$The force required to remove the tape from the roll at 150 ft./min. Pressure Sensitive Tape Council Test, PSTC-8.
$^b$180° peel, PSTC-1
$^c$The force resisting peeling of a tape at a 90° angle from a polished stainless steel surface upon which it has been applied under no other pressure than the weight of the tape itself, PSTC-5.
$^d$Delamination and shattering of the backing.

One can see from the above data that of the three different pressure-sensitive adhesive tapes tested, the ones coated with the silicone release materials result in the best overall performance. These two materials provide comparable release characteristics as indicated by the unwind adhesion data; however, in the case of the release agent of the invention, this result is obtained without need for curing. Moreover, comparable release properties are obtained with use of considerably less silicone polymer. Thus, suitable release characteristics are provided at much less cost.

The above data are believed representative of the results obtained using these various release agents. The data were obtained in averaging together three different evaluations made.

On visual observation of each of the control tapes, slight pick-off of the release agent from the backing member was noticed. There was none noticed in the case of the polysiloxane-urethane release agent of the invention. Moreover, quite importantly, even though the release agent of the invention provides low unwind characteristics, it still is found to have good adhesion to the backing member.

EXAMPLES 3-7

These examples illustrate various combinations of monomers that can be used to obtain linear siloxane-thiourethane copolymers in accordance with the invention and the excellent release characteristics obtained with various pressure-sensitive adhesive tapes.

The first step of the polymerization was carried out by dissolving the organo functional terminated dimethyl siloxane oligomer of Example 1 in a (1/1) solvent mixture of xylene-dimethyl formamide (DMF) and reacting it with a diisocyanate, as indicated, at a temperature of 90°-100° C. for a few minutes. Further extension of the polymer chain was carried out as in Example 1. The reactions were catalyzed using 0.1% (by total weight) dimethyltin diacetate and 0.1% (by total weight) triethylene diamine in combination. The reaction was considered complete when the (-NCO)

peak at 2270m$^{-1}$ almost disappears in infra-red analysis.

A few drops of each of the resulting reactant solutions were allowed to evaporate at room temperature (74° F.) for three days. A solid residue was left behind, the physical nature of which is indicated below.

| SAMPLE CODE | EXAMPLE NO. | MOLAR RATIO REACTANT B | REACTANT C |
|---|---|---|---|
| 66Δ | 3 | 2MDI | 1 H$_2$O |
| 31Δ | 4 | 2TDI | 1MDA |
| 66A | 5 | 6MDI | 5TEG |
| 66B | 6 | 20MDI | 13TEG + 6PEG |
| 66C | 7 | 6TDI + 5TEG PREPOLYMER | NONE |

The key to the symbols in the table is as follows:

| | | |
|---|---|---|
| TDI | = | 2,4-Tolyene diisocyanate |
| MDI | = | Methylene bis-(4 phenylisocyanate) |
| PEG | = | Polyethyle glycol, 590 Molecular Weight |
| TEG | = | Triethylene glycol |
| MDA | = | 4,4'-Methylene dianiline |

To show the utility of the release agents, according to the invention, with different adhesive formulations, hot melt adhesives were prepared of the following formulation:

| COMPONENTS | ADHESIVE TYPE | | |
|---|---|---|---|
| | I | II* | III |
| | (Parts by Weight) | | |
| Kraton 1107 styrene-isoprene-styrene copolymer | 100 | 100 | 100 |
| Polyterpene Resin, m.p. 95° C. | 50 | 50 | 100 |
| Glycerol ester of Hydrogenated Rosin, m.p. 73° C. | 50 | 50 | — |
| Polyterpene Resin, m.p. 25° C. | 50 | — | 100 |
| Liquid Polybutene Resin (Polyvis 10 SH) | — | — | 35 |
| Butyl Zimate | 5 | — | 5 |
| Antioxidant | 2 | 3 | 2 |

(*Same formulation as in Example 2)

Two solvent based adhesives were also prepared. These were of the following formulation:

| COMPONENTS | ADHESIVE TYPE | |
|---|---|---|
| | IV | V |
| | (Parts by Weight) | |
| Natural Rubber | 80 | 25 |
| Butadiene styrene rubber | 20 | 25 |
| Polyisoprene | 25 | 50 |
| Natural Rosin, soft. p. 165–174° F., Acid Value: 170 | 15 | — |
| Synthetic polyterpene, soft. p. 100° C. | 45 | 70 |
| Zinc resinate | 20 | — |
| Zinc oxide | — | 50 |
| Novolak phenolic resin | 10 | |
| Alkylated phenolic resin | 5 | |
| Dehydroabisatic acid | — | 10 |
| Oil plasticizer | 10 | 40 |
| Butyl zimate | 1 | — |
| Antioxidant | 1 | 2 |

The adhesive compositions were then coated onto three different backing members differing from one another as below indicated:

1. Backing Member No. 1; a glass fabric reinforced polyethylene terephthalate film laminated backing member as described in Example 2.

2. Backing Member No. 2; a glass fabric reinforced latex impregnated paper combination backing member. This backing is prepared, in general, by impregnating a 29 lb. basis weight crepe paper with a latex comprising 100 ph$^2$ SBR and 2.5 ph$^2$ acrylic rubber. The glass fabric was laminated to the paper backing using the element described in Example 2.

3. Backing Member No. 3; The latex impregnated member of Backing Member No. 2.

The hot melt adhesives identified above were coated respectively on each of the backing members. The amount of adhesive deposited on each was 2.8 ounces/yd$^2$. The solvent adhesive identified as Type IV was coated on backing member no. 1, the amount dried adhesive being 1.8 oz./yd$^2$. Solvent adhesive Type V was coated at 2 oz./yd$^2$ (dry) on backing member no. 3.

A part of each of the release agent solutions was then diluted with an 80/20 (by wt.) solvent mixture of 2-butanone and DMF to obtain 2% solid solutions. A 1 mil poly(ethylene terephthalate) film, as disclosed in Example 2, was then backsized with each solution as before disclosed. The solvent was driven off at room temperature (74° F. for about ½ hour) leaving a dried release film of about 0.003 oz/sq. yd.

The backsize film was then tested for release and pickoff as follows: A strip (1 inch × 6 inches) of each adhesive coated backing member was applied to a sheet of the previously described various coated release materials. The adhesive strips were rolled down (adhesive against the release layer) three times in each direction, with a 4½ lb. rubber covered steel roller. Each of these assemblies was then individually secured by means of a 2 inches wide double faced pressure sensitive adhesive tape to a 2 inches × 6 inches rigid steel plate and wet aged, as described in Example 2, for 16 hours.

After aging, the adhesive coated strips, applied to the various release coated backings, were tested for adhesion properties. This testing was accomplished using an Instron Tester at a 90° angle and 50 inches per minute separation. The adhesion values obtained with the various tapes are tabulated in the table below. The peeled tapes were then reapplied to a stainless steel plate to measure quickstick (PSTC-3) and adhesion to stainless steel (PSTC-1). These values are compared with the results obtained with uncoated Mylar polyester film (control).

After thorough mixing of the ingredients, the release composition was coated at 0.5 oz./sq. yd. (dry weight) on a 27 lb./ream kraft paper impregnated with 14 lbs./ream of a heat cured acrylic latex. The epoxide in the release composition was allowed to cure at room temperature, e.g., 74° F., over a period of six days.

Table to Examples 3–7

| Release Copolymer Example | Adhesion of the Copolymer Coating to the various tapes, lb./in. | | | | | Quick Stick of Tapes Reapplied to S. Steel lb./in | | | Adhesion Of Tapes Reapplied to S. Steel lb./in | | |
|---|---|---|---|---|---|---|---|---|---|---|---|
| | I | II | III | IV | V | I | II | III | I | IV | V |
| 3 | 1.7 | | | 2.1 | 0.8 | 2.1 | | | 2.1 | 2.2 | 2.0 |
| 4 | — | 2.2 | 3.2 | | | — | 2.3 | 3.5 | | | |
| 5 | 1.4 | | | 2.4 | 1.3 | | | | 2.2 | 2.9 | 1.9 |
| 6 | 2.0 | | | 2.7 | 1.5 | | | | 2.2 | 3.0 | 1.9 |
| 7 | 2.1 | | | 2.7 | 1.9 | | | | 2.0 | 2.5 | 1.8 |
| Uncoated Mylar (Control) | 5.5 | 14.0 | * | * | — | 1.0 | 1.9 | * | | | |

*The tape delaminates

Thus it is shown that various reactants can be substituted for Components B and C in Example 1. The data, moreover, indicates that good unwind is found with the release agent of the invention with a variety of adhesive formulations.

In order to test the release characteristics of this coating, two pressure sensitive adhesive tapes, Adhesive Types II and III of Examples 3–7 were applied to it, rolled down, aged and tested as before described.

The following results were obtained:

| | Adhesion of Tape To the Coatings (lbs./in.) | | Quickstick to S.S. of Reapplied Tapes (lbs./in.) | |
|---|---|---|---|---|
| | II | III | II | III |
| Epoxy Coating containing the silicone copolymer | 1.4 | 2.1 | 1.4 | 2.9 |
| The same coating without the silicone | 10.0 | 13.5 | 0.8 | 1.9 |

EXAMPLE 8

This example illustrates the usefulness of a release agent in accordance with the invention as an additive in very small quantities with a film former in the preparation of a release composition of the following formulation:

| COMPONENT | PARTS BY WEIGHT |
|---|---|
| Araldite 6005*(Wt./epoxide-175, viscosity 8 cps.) | 75 |
| Vinylcyclohexene dioxide | 25 |
| Triethylene tetramine | 13 |
| Linear silicone copolymer of Example 1 | 1.5 (dry) |

*An amine curable epoxy resin prepared by the polycondensation reaction of bisphenol A and epichlorohydrin and marketed by the Ciba-Geigy Corp.

Thus, one can readily see that improved release characteristics are provided in a film forming composition by incorporating therein only a small amount of a release agent in accordance with the invention. Such a result is often desired in, among other applications, the molding of various objects. The mold surfaces may be provided of, or coated with such a release composition, or the molded object per se may be of the composition.

EXAMPLES 9–12

The release agent of Example 1 was blended at the 5%, 1%, 0.3% and 0.1% by weight level (all dry) with an alkyd type film forming composition of the following formulation:

| | Parts By Weight |
|---|---|
| Duraplex ND-77B (Rohm-Haas) (A 60% solution of a nonoxidizing pure phthioic alkyd resin [coconut oil] in xylene | 10.0 |
| Uformite (sp) MM-55 (Rohm-Haas) (A 50% solution of a butylated melamine formaldehyde resin in xylene/butanol [¼]) | 2.0 |
| V A G H Resin (Union Carbide) (A copolymer of vinylchloride [93%], vinyl-alcohol [2.3%] and vinylacetate [3%]) | 1.0 |
| Triethylamine | 0.05 |
| Toluene | 5.3 |
| Mixed ketone blend (open cup flash point: 21° C) | 5.3 |

These formulations were coated onto the impregnated paper backing member, backing member no. 3 of Examples 3–7, in an amount to provide a dry weight of 0.4 oz./yd.² This was accomplished by heating the release composition at 300° F. for 15 minutes to drive off the solvent and cure the film former.

The back size coated backing members were then coated with the adhesive mass IV set forth in Examples 3–7 after which the mass coated sheets were slit to 1 inch wide rolls of tape. These were wet aged for 16 hours and tested for unwind and adhesion. The results are indicated below:

| Example | % Release Agent in Film Former | Unwind, lb./in 90°, 50"/min. | Ad. SS, oz./in. 90°, 12"/min. |
|---|---|---|---|
| 9  | 5.0% | 1.5 | 22 |
| 10 | 1.0% | 1.5 | 21 |
| 11 | 0.3% | 2.0 | 22 |
| 12 | 0.1% | 2.6 | 22 |

It is seen that incorporating relatively small amounts of release agent according to the invention with a film former to form a release composition results in good unwind characteristics.

The invention has been more particularly described in the various examples as a release agent per se or as a component of a release coating composition for pressure-sensitive adhesive tapes. By virtue of its abhesive properties, however, the copolymeric material of this invention will be found suitable in numerous applications. It can be used, inter alia, as a coating for fibrous containers, conveyor belts, and various coverings and items which come into contact with such sticky and tacky materials such as bread dough, rubber, candy, plastics, the adhesive undersurface of linoleum and the like during manufacture, transportation, and storage of these materials. Other uses include as a mold release coating and as a release surface from various substrates; water repellant coating in paper, textile, and metal finishing, an antiblock and slip agent for inks and coatings, and as an internal lubricant for plastic compositions.

What I claim is:

1. Release agent comprising the reaction product of a composition comprising in admixture:
   a. a di (omega-organofunctional) dimethylsiloxane oligomer represented by the formula:

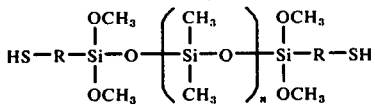

wherein R is an olefin hydrocarbon radical having at least two carbon atoms and n is an integer from 5 to 100;
   b. a difunctional organic compound capable of reacting with the active hydrogen of the terminal groups of the dimethylsiloxane oligomer selected from the group consisting of aromatic and aliphatic diisocyanates and diisocyanate prepolymers resulting from the reaction of a difunctional organic compound containing active hydrogen groups with a large excess of diisocyanate; and
   c. when said difunctional organic compound is selected from the group of aromatic and aliphatic diisocyanates, a second difunctional organic compound containing active hydrogen groups.

2. Release agent according to claim 1 wherein R is propylene, and n is about 25.

3. Release agent according to claim 2 wherein the first named difunctional organic compound is an aromatic diisocyanate.

4. Release agent according to claim 3 wherein the diisocyanate is 2,4-toluene diisocyanate.

5. Release agent according to claim 1 wherein the said second difunctional organic compound is selected from the group consisting of hexamethylene diol, triethylene glycol, OH-terminated polytetramethylene glycol of 1000 molecular weight, OH-terminated poly-(ethylene adipate) of 300–3000 molecular weight, methylene-bis(4-aniline), propylene diamine, $NH_2$-terminated polyoxyethylene of 1500 molecular weight, hexamethylene dithiol, and thiol-terminated polyoxypropylene of 200–2000 molecular weight.

6. Release agent according to claim 4 wherein the second difunctional compound is triethylene glycol.

7. Release agent according to claim 1 wherein the release agent is the reaction product of a composition comprising in admixture:
   a. from 20 to 95% by weight of a di (omega-organofunctional) dimethylsiloxane oligomer represented by the formula:

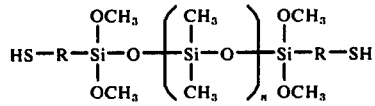

having a molecular weight of 3000 and wherein R is propylene;
   b. toluene-2,4 diisocyanate in the range of from 5 to 75% by weight of the composition; and
   c. triethylene glycol in the range of 0 to 70% by weight of the composition.

8. Release agent according to claim 7 wherein the components of the reaction mixture are present in the proportions indicated below:

| COMPONENTS | GRAMS |
|---|---|
| mercapto silicone polymer | 150.0 |
| 2,4 toluene diisocyanate | 53.9 |
| triethylene glycol | 37.5 | and the reaction product has an intrinsic viscosity of 0.12 and a critical surface tension of 19 dynes/cm.

9. Release composition comprising as a major ingredient a film former and as a minor ingredient a release agent in accordance with claim 1, the surface tension of the film former being greater than that of the release agent.

10. Release composition according to claim 9 wherein the difference between the surface tension of the film former and the release agent is at least 15 dynes/cm.

11. Release composition according to claim 10 wherein the film former is an epoxy resin.

12. Pressure-sensitive adhesive material comprising a backing member having a front side and a back side, a pressure-sensitive adhesive mass on the front side, and a back size on the back side of the backing member comprising a release agent comprising the reaction product of a composition in accordance with claim 1.

13. Pressure-sensitive adhesive material according to claim 12 wherein the backing member is a polyester film.

14. Pressure-sensitive adhesive material according to claim 13 wherein the adhesive material is in the form of a tape in roll form, said composition providing satisfactory unwind characteristics and release from an adhesive mass of high adhesion characteristics.

15. Composition of matter for use as a release agent comprising a linear block copolymer having the recurring unit:

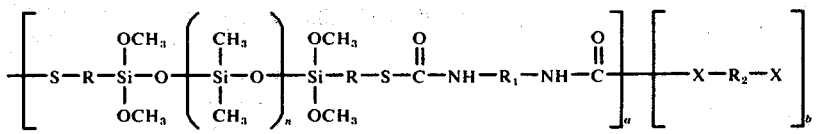

wherein R is an olefin hydrocarbon radical having at least two carbon atoms, $R_1$ is a divalent radical selected from the group consisting of aliphatic and aromatic radicals, X is a member selected from the group consisting of O, S, and NH, $R_2$ is a member selected from the group consisting of divalent radicals selected from the group consisting of alkyl, and alkylaryl, polyethers, and polyesters, n is an integer from 1 to 100, and a and b are integers chosen so as to provide a copolymer having a molecular weight as defined by intrinsic viscosity of at least 0.05, the ratio of b/a is in the range of from 0 to 3, and the polysiloxane block is present in an amount from 30 to 95% of the copolymer.

* * * * *